United States Patent [19]

Engel et al.

[11] Patent Number: 4,612,202

[45] Date of Patent: Sep. 16, 1986

[54] METHOD FOR MAKING A LOW CALORIE DIPEPTIDE SWEETENING COMPOSITION OF ALKALINE PH

[75] Inventors: Robert Engel, New City; Adolph P. Gobel, IV, White Plains, both of N.Y.; John E. Hammond, Glen Rock; Alfred C. Glatz, Summit, both of N.J.

[73] Assignee: General Foods Corporation, White Plains, N.Y.

[21] Appl. No.: 596,781

[22] Filed: Apr. 4, 1984

[51] Int. Cl.[4] ..................... A23L 1/236; A23L 1/10
[52] U.S. Cl. ..................... 426/548; 426/385; 426/456; 426/471
[58] Field of Search ............... 426/548, 456, 471, 444, 426/465, 385

[56] References Cited

U.S. PATENT DOCUMENTS 3,753,739  8/1973  Cella et al. ..................... 426/548
3,875,312  4/1975  Eisenstadt ..................... 426/548
3,971,857  7/1976  Fruda et al. ..................... 426/548

Primary Examiner—Thomas G. Wiseman
Assistant Examiner—Elizabeth C. Weimar
Attorney, Agent, or Firm—Joseph T. Harcarik; Thomas R. Savoie; Daniel J. Donovan

[57] ABSTRACT

Readily soluble, sweetening compositions are produced by co-drying solutions at a pH between about 9.0 and about 10.0 which comprise an edible bulking agent, a dipeptide sweetening compound, and an alkalizing agent.

8 Claims, No Drawings

METHOD FOR MAKING A LOW CALORIE DIPEPTIDE SWEETENING COMPOSITION OF ALKALINE PH

BACKGROUND OF THE INVENTION

This invention relates to a readily soluble sweetening composition containing an edible bulking agent, a dipeptide sweetening agent and more particularly to a low bulk density sweetening composition which in appearance and behavior is similar to ordinary, granulated sucrose but which possesses a bulk density and caloric value per unit of volume considerably less than that of sucrose.

It has recently been found that certain dipeptide compounds possess an intense sweetness level. Examples of these compounds are set forth in U.S. Pat. Nos. 3,475,403 and 3,492,131. These dipeptide materials would appear to have great commercial applications as sweetening agents since they range up to 200 times the sweetness level of sucrose, have no discernible unpleasant aftertaste, and can be produced from naturally occurring amino acids. However, problems have arisen with the use of these compounds: their rate of solution in water is markedly slower than that of sucrose; and these compounds, when in solution, tend to decompose, losing substantially all their sweetness, upon heating for extended periods of time at temperatures above about 80° C.

Glicksman et al., U.S. Pat. No. 3,761,288 set forth a composition which is produced by co-drying a solution of an edible bulking agent and a dipeptide sweetening compound and is more readily soluble than the dipeptide sweetening agent alone. Nonetheless, Glicksman et al. teach that at least about 40 seconds are required to completely dissolve 1.5 gm of their composition (containing 0.036 gm of sweetener) in 170 ml of 4° C. water. Consequently it is an object of the present invention to produce an instantly dissolving composition comprising a dipeptide sweetener. It is an object of this invention to produce a low-calorie substitute for granulated sucrose.

SUMMARY OF THE INVENTION

It has now been found that the rate of solution of dipeptide sweetening compound can be significantly increased by co-drying an aqueous solution of an edible bulking agent, the dipeptide sweetening compound and an alkalizing agent. It has also been found that these aqueous solutions may be dried at conditions of elevated temperatures (i.e., above 100° C.) without significant adverse effects on the sweetening level of the dipeptide compounds, if the solution is exposed to the elevated temperature for a short time. Alternatively, these aqueous solutions may be freeze-dried.

DESCRIPTION OF THE INVENTION

The solid edible bulking agents suitable for use in this invention may be any of the non-toxic substances or combination of substances heretofore employed by the prior art for this purpose including vegetable and seaweed gums, gelatin and hydrolyzed starch materials such as dextrins and sugars. Especially suitable among these solid bulking agents are the dextrins derived from the class of materials commonly known as corn syrup solids, since with certain of these materials it is possible to produce a low calorie, low bulk density, non-hygroscopic sweetening composition which has the appearance of table sugar and which will dissolve readily in cold water.

According to one embodiment of this invention a table sugar substitute having the appearance of crystalline sucrose may be prepared by forming a uniform aqueous solution of a corn syrup dextrin material, a dipeptide sweetening agent and an alkalizing agent and drying this solution in a manner so as to yield an expanded product which may then, if necessary be ground to size. Alternatively, the product may be agglomerated to produce a coarser granulation. Drying methods such as spray- and drum-drying have been found suitable for producing these table sugar substitutes.

The dextrin material used for the production of these sugar substitutes must dissolve easily in water to produce a clear solution and must be non-hygroscopic. In this regard the D. E. (dextrose equivalent) of the dextrin material has been found to be a critical parameter. The dextrin material must have a sufficiently low molecular weight to be easily soluble in water and to produce a clear solution so that the final product will have the essential reflecting surfaces in order to give the appearance of a crystalline product. On the other hand the molecular weight of the dextrin material must be high enough so that hygroscopicity is avoided.

Accordingly, it has beem determined that for the production of table sugar substitutes the dextrin material should have a D. E. in the range of about 4 to 20 and preferably in the range of about 5 to 10. Additionally it has been found that the best results are obtained if the dextrin material contains little or no monosaccharide (i.e., glucose) and contains an irregular distribution of the other lower (two to eight saccharide units) saccharides with a preponderance of the hexamer and heptamer. Such corn syrup dextrins have been produced by means of enzymatic hydrolysis of starch and are typified by the products available from CPC under the name Mor-Rex and Frodex.

The most suitable dipeptide sweeteners for use in the invention are the lower alkyl esters of aspartyl-phenylalanine wherein the stereochemcial configuration is L-L, DL-DL, DL-L or L-DL. Illustrative of the lower alkyl esters are methyl, ethyl, propyl, butyl, pentyl, hexyl, heptyl and the branched chain groups isomeric therewith. The methyl ester of aspartylphenylalanine is the most preferred isomer for the purposes of the present invention. It is further preferred that the dipeptide sweetener used in the present invention be L-aspartyl-L-phenylalanine.

Additionally, it is preferred that the ratio of bulking agent to dipeptide sweetener is between about 25 and about 1 part bulking agent for each part dipeptide sweetener (i.e., between about 25:1 and about 1:1). More preferably, the ratio of bulking agent to dipeptide sweetener is between about 15 and about 1.5 parts bulking agent to each part dipeptide sweetener (i.e., between about 15:1 and about 1.5:1).

The alkalizing agent used for the production of these sugar substitutes may be any food approved alkali, especially hydroxides, carbonates, bicarbonates, phosphates, ammonates, and combinations thereof. It is preferred that the alkalizing agent is an alkali metal salt, an ammonium salt, an alkaline earth metal salt, or a combination thereof. It is further preferred that the alkalizing agent be an alkali metal salt and it is most preferred that the alkalizing agent be an alkali metal hydroxide such as sodium hydroxide, potassium hydroxide, and combinations thereof.

The amount of alkalizing agent combined with the dipeptide sweetening compound and the bulking agent should be effective to produce a pH between about 7.0 and about 11.0. It is preferred that the amount of alkalizing agent be effective to produce a pH between about 8.0 and about 10.5 and it is more preferred that the amount of alkalizing agent be effective to product a pH between about 9.0 and about 10.0. However, while the alkalizing agent will produce these pHs in the aqueous alkali-bulking agent-sweetener solutions before the solution is dried, the pH of the media to which the dried sweetening composition is added will predominantly be determined by the non-sweetening composition components of said media.

As the alkali pH used in the present invention will cause the dipeptide sweetener to decompose in solution, the alkali should be added just prior to drying the solution. Preferably, the alkali-bulking agent-dipeptide sweetener solution is dried within 10 minutes of mixing the dipeptide sweetener and alkali together. More preferably, the solution is dried within 5 minutes of mixing the dipeptide sweetener and alkali together, and most preferably, the dipeptide sweetener and the alkali are mixed in the processing stream just prior to the entry of the solution into the dryer. It is further preferred that this mixing is by a rapid or high shear mixing process.

Thus at least about 85%, by weight, and preferably at least about 95% of a sweetening composition made according to the present invention consists of a co-dried admixture of a dipeptide sweetener, an edible bulking agent, and an alkalizing agent. The ratio of the bulking agent, to the sweetener in the co-dried admixture is between about 25:1 and about 1:1, by weight, and more preferably this ratio is between about 15:1 and about 1.5:1. Additionally, the ratio of the alkalizing agent to the dipeptide sweetener in the co-dried admixture is between about 1.4:1 and about 0.6:1, on a molar (or number of molecules) basis. Preferedly, the alkalizing agent to dipeptide sweetener ratio, on a molar basis, is between about 1.2:1 and about 0.8:1.

The processes of this invention are further illustrated, but not limited by the following examples:

EXAMPLE 1

A suspension of aspartyl-phenylalanine methyl ester, 10 g and Frodex TM 10 D. E., 20 g in 100 ml water was combined with sufficient potassium hydroxide to bring the suspension pH to 9.2. This suspension was then immediately spray dried. The resultant powder, 0.2 g were combined with 500 ml of water. The sweetening composition of the present invention was instantly soluble: within 5 seconds, and the solution was sweet.

A 1.5 g sample of currently commercially available (Tokei) L-aspartyl-L-phenylalanine methyl ester requires 5 minutes of continuous mixing (via a magnetic stirrer) to dissolve in 1 liter of ambient temperature (about 22° C.) water.

Additional tests have shown that varying the level of dipeptide in the sweetening compositions up to the level of about two parts dipeptide per part of bulking agent, does not have any appreciable or predictable effect on the rate of solution. All samples prepared in accordance with this invention were found to dissolve in water as cold as 40° F. in less than 1 minute, whereas complete solution of equivalent amounts of the dipeptide material taken alone requires a time of about 30 minutes.

It has also been found that the elevated temperatures, in excess of 100° C., which are employed during the spray drying do no affect the sweetness of the final product.

The bulk density of the final sweetening composition can be controlled by varying the solids concentration of the solution prior to drying. The bulk density may also be controlled by changing the method of drying, by varying the rate of drying, or by varying the conditions of pressure or vacuum, and the dissolved gas concentration under which the solution is dried, or by a post-drying process such as agglomeration. Bulk densities ranging as low as about 0.04 g/cc. can be obtained by the process of the present invention.

Thus by exercising proper control over the process it is possible to produce a final product which has substantially the same bulk density of granulated sucrose or a product which has a much low bulk density than granulated sucrose but which by adjusting the level of dipeptide sweetening compound, has on a volume basis the same level of sweetness as sucrose but a far less caloric value.

EXAMPLE 2

The sweetening composition of Example 1 was combined with the following ingredients to produce a powdered soft drink mix.

| Ingredient | % by Weight of Mix |
|---|---|
| Example 1 Sweetening Composition | 29.8 |
| Powdered Beverage Base Comprising: acidulant; flavors; colorants; and vitamins | 70.2 |

Thereafter, the above ingredients were blended to produce a homogenous mix. The mix was combined with water in the ratio of 11.32 g mix to 1890 ml water to produce 8 servings of the soft drink.

This soft drink tasted similar to a prepared sample of commercially available, Sugar-Free KOOL-AID ®.

What is claimed is:

1. A method for producing a readily soluble sweetening composition comprising the steps of forming an aqueous dispersion of an edible bulking agent and a dipeptide sweetening compound adjusting the pH of said dispersion with an alkaline agent to between about 9.0 and about 10.0, and drying said solution wherein said bulking agent is hydrolyzed starch materials.

2. A process according to claim 1 wherein said drying is at conditions of elevated temperature above 100° C.

3. A process according to claim 1 wherein the sweetening compound is L-aspartyl-L-phenylalanine methyl ester.

4. A process according to claim 1 wherein said drying is by drum drying.

5. A process according to claim 1 wherein said drying is by spray drying.

6. A process according to claim 1 wherein said drying is by freeze-drying.

7. A process according to claim 1 wherein the ratio of bulking agent to dipeptide sweetener is between about 25:1 and about 1:1.

8. A product according to the process of claim 1.

* * * * *